United States Patent
McKinney et al.

[11] Patent Number: 6,131,298
[45] Date of Patent: Oct. 17, 2000

[54] SELF-SUPPORTING LEVEL MEASUREMENT DEVICE

[76] Inventors: William McKinney; Charles H. Goodin, both of P.O. Box 1974, Mountain View, Ark. 72560

[21] Appl. No.: 09/086,259

[22] Filed: May 28, 1998

[51] Int. Cl.[7] ................................................. G01C 9/28
[52] U.S. Cl. .......................................... 33/372; 33/370
[58] Field of Search ............................. 33/371, 379, 333, 33/334, 370, 372, 451

[56] References Cited

U.S. PATENT DOCUMENTS

| | | | |
|---|---|---|---|
| D. 171,317 | 1/1954 | Von Duyke | D52/6 |
| D. 255,434 | 6/1980 | Hanson | D10/69 |
| D. 292,679 | 11/1987 | Fincher | D10/69 |
| D. 305,202 | 12/1989 | Johnson | D8/70 |
| 2,624,118 | 1/1953 | Anderson | 33/372 |
| 4,066,232 | 1/1978 | Hermeyer | 248/226.2 |
| 4,194,295 | 3/1980 | Simuro et al. | 33/458 |
| 4,400,889 | 8/1983 | Busey | 33/372 |
| 4,782,597 | 11/1988 | Mills | 33/370 |
| 4,910,876 | 3/1990 | Channell | 33/374 |
| 4,947,556 | 8/1990 | Peil | 33/371 |
| 4,970,796 | 11/1990 | Masters et al. | 33/347 |
| 5,402,579 | 4/1995 | Smith | 33/354 |
| 5,815,937 | 10/1998 | Glorioso, Jr. | 33/372 |

*Primary Examiner*—Diego Gutierrez
*Assistant Examiner*—Maue Fernandez
*Attorney, Agent, or Firm*—John D. Gugliotta

[57] ABSTRACT

Disclosed is an otherwise conventional level measurement device adapted so as to include a means by which a spring biased clamping device can be used to attach the level to a workpiece, thus freeing the user's hands and allowing the performance of other tasks.

4 Claims, 6 Drawing Sheets

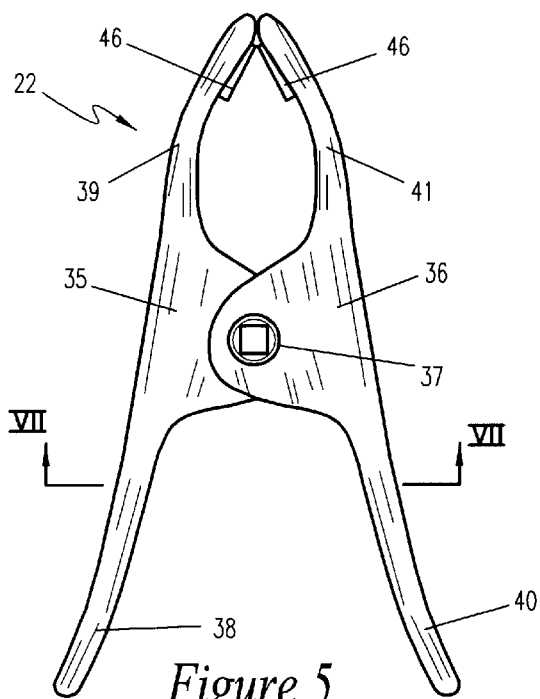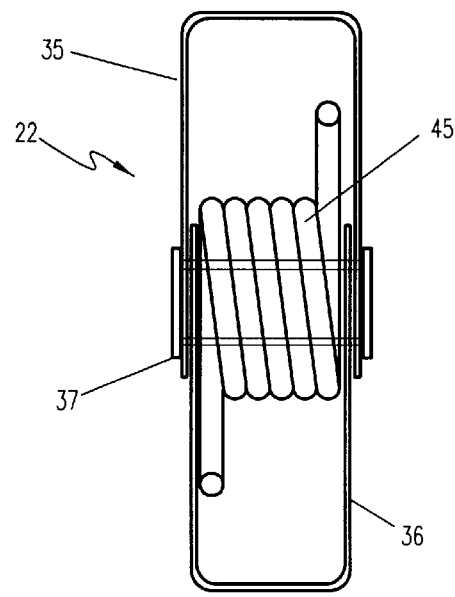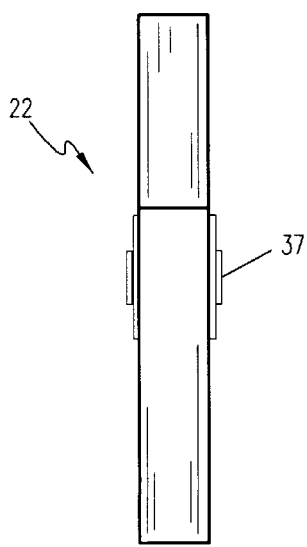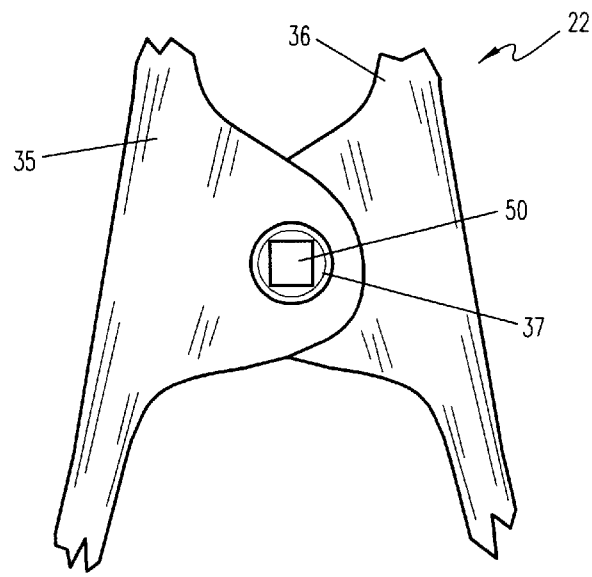
Figure 5
Figure 7
Figure 6
Figure 8

SELF-SUPPORTING LEVEL MEASUREMENT DEVICE

BACKGROUND OF THE INVENTION

1. Field of the Invention

The present invention relates generally to level measurement devices used in construction, carpentry work and the like, and more specifically to a level measurement device that includes a means by which to secure it to the work piece, thus freeing the hands, allowing the user to work with unrestricted movement.

2. Description of the Related Art

Level measurement devices are well-known throughout construction, carpentry and many other arts and professions. These devices are used to indicate true vertical, horizontal and angular workpiece component orientations and spatial relationships. The most popular and widely used varieties of these devices incorporate the use of bubble levels to indicate when these orientations and spatial relationships are achieved. The bubble level consists of a small, sealed cylindrical vial that is filled with a fluid substance of a volume slightly less than that of the vial. The volume of the vial being greater than that of the fluid, a bubble is created within the vial. Due to the tendency of the bubble to rise to the highest portion within the vial, it can be used to indicate when the vial is at a true horizontal position. When the bubble is located between indicating lines scribed at the center of the vial, a true horizontal position has been achieved.

The most commonly used level indicating device, the carpenter's level, consists of an elongated rectangular frame with bubble levels attached in orientations parallel and perpendicular to the longitudinal axis of the frame. When the carpenter's level is placed flat or flush against the surface of a workpiece, the bubble levels indicate whether the piece has a true vertical or horizontal orientation.

While the aforementioned use remains the dominant means by which the bubble level is used, a variety of other uses have been developed as well. Individual bubble levels are fit within small frames that allow the user to permanently attach the level to virtually any surface. As a result, the bubble levels are used to indicate the orientation of a wide range of items ranging from power tools to motor homes.

The primary use of the bubble level, i.e. relating to the use of a carpenter's level in the positioning or a workpiece suffers from one primary drawback. In using these levels, one must use at least one, if not both of his or her hands to secure the level to the surface of the workpiece. In doing so, the user is limited in the functions that can be performed while monitoring the level indicator. This problem is compounded due to the fact that, quite often, marking, nailing, fastener tightening or other operations that require the use of both hands need to be performed while monitoring the level. As a result, the user is forced to take an awkward position, risking accuracy, or employ the service of another person in order to complete the task.

The present invention solves the aforementioned problems by providing an otherwise conventional level indicating device, more specifically a carpenter's level, that is adapted to permit the use of spring-biased clamping devices to secure the level to the workpiece, thus freeing the user's hands, and allowing him or her to focus on the task at hand. The clamps are removable, allowing the level to be used in a conventional manner.

In the ancillary art, there have been several attempts at modifications or alternative uses for conventional bubble levels:

U.S. Pat. No. 4,066,232, issued in the name of Hermeyer, discloses a clamp-on level holder consisting of a rectangular shell affixed to a spring-biased clamp for securing the shell onto a scaffolding or mortar board. The shell is used to hold a conventional carpenter's level in a conveniently accessible but safe location, or for use in storing the level when not in use. While this disclosure describes a means by which to support a carpenter's level using a spring-biased clamping device, it differs from and lacks the capacity to perform several functions of the present invention. The holder is not intended to be used to secure the level to a workpiece. The rectangular frame prevents the level from being placed flush with the workpiece, which is integral in obtaining an accurate reading. Finally, the holder does not permit flexibility in the positioning of the clamp to accommodate for varying application situations.

U.S. Pat. No. 5,402,579, issued in the name of Smith, discloses a C-clamp with an integral bubble level intended to be used to position pipes and the like by attaching the clamp thereto. While the intentions behind this invention are similar to that of the present invention, it differs from and lacks the capacity to perform several functions of the present invention. The incorporation of a single bubble level limits the orientation at which the clamp can be used to determine whether the workpiece is level. For example, if the clamp is attached to a horizontal workpiece, the bubble level is of no use because it is oriented in a vertical manner. Furthermore, the relatively small surface area of the engaging members of the clamp increases the likelihood that the level could become skewed in relation to the work surface, creating inaccurate measurements.

U.S. Pat. No. Des. 292,597, issued in the name of Fincher, discloses an otherwise conventional carpenter's level incorporating a strapping mechanism that provides a means by which to secure the level to a workpiece. While the intentions behind this invention are similar to that of the present invention, it differs from and lacks the capacity to perform function in a manner similar to that of the present invention. The use of the strapping mechanism limits its use in that it works only with workpieces that the strap can be wrapped around.

U.S. Pat. No. 4,782,597, issued in the name of Mills, discloses a bubble level assembly that can be attached to a work piece or the like via screws or other similar attachment means. The obvious drawbacks to this device is that it is intended for permanent attachment and would be extremely burdensome to use in the manner intended by the present invention. Furthermore, the Mills device inherently necessitates the creation of holes in the material onto which it is attached.

Several other patents are considered related in function or design but do not necessarily warrant discussion in detail:

U.S. Pat. No. 4,970,796, issued in the name of Masters et al.

U.S. Pat. No. 4,910,876, issued in the name of Channell.

U.S. Pat. No. 4,194,295, issued in the name of Simuro et al.

U.S. Pat. No. Des. 305,202, issued in the name of Johnson.

U.S. Pat. No. Des. 255,434, issued in the name of Hanson.

U.S. Pat. No. Des. 171,317, issued in the name of Von Duyke.

While several features exhibited within these references are incorporated into this invention, alone and in combination with other elements, the present invention is sufficiently different so as to make it distinguishable over the prior art. Consequently, a need has been felt for a level indicating instrument that includes a means by which to secure it to the work piece in order to free the hands of the user.

SUMMARY OF THE INVENTION

The present invention consists of an otherwise conventional carpenter's level adapted so as to include a means by which a spring biased clamping device can be used to secure the level to a workpiece. The level is constructed such that the clamping devices are detachable, allowing the user to operate the level in a traditional manner. The clamps attach to the level at either end, or in the middle, via a socket and pin type securing means similar in nature to that of conventional socket-type wrenches. The orientation of the clamps is such that, when in use, the level is secured to the workpiece in a position flush with the surface thereof.

Accordingly, it is an object of the present invention to provide a self-supporting level measurement device used to indicate when a true vertical or horizontal orientation of a workpiece has been achieved.

It is another object of the present invention to provide a self-supporting level measurement device that can be secured to a workpiece in order to free the hands of the user and allow the user to work freely in an unrestricted manner.

It is another object of the present invention to provide a self-supporting level measurement device that incorporates the use of spring-biased clamping devices to attach the level to the workpiece.

It is another object of the present invention to provide a self-supporting level measurement device that secures flush with the surface of the workpiece, thus providing for accurate measurements.

It is another object of the present invention to provide a self-supporting level measurement device with removable clamping devices that allow the level to be used in a manner similar to that of conventional carpenter's levels.

It is another object of the present invention to provide a self-supporting level measurement device wherein clamping devices can be attached to the level on either end, or in the middle, thus allowing for a versatile clamping configuration that will accommodate a variety of workpiece sizes and orientations.

Finally, it is an object of the present invention to provide a self-supporting level measurement device of an economical and durable construction that will withstand both residential and commercial or industrial applications.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is a front view of the spring biased clamping device of the self-supporting level measurement device;

FIG. 6 is a side view of the spring biased clamping device of the self-supporting level measurement device;

FIG. 7 is a sectional view of the spring biased clamping device of the self-supporting level measurement device depicting the spring biasing means incorporated therein;

FIG. 8 is a partial front view of the spring biased clamping device of the self-supporting level measurement device depicting the pin receiving socket portion thereof;

LIST OF REFERENCE NUMBERS

Figure 1:
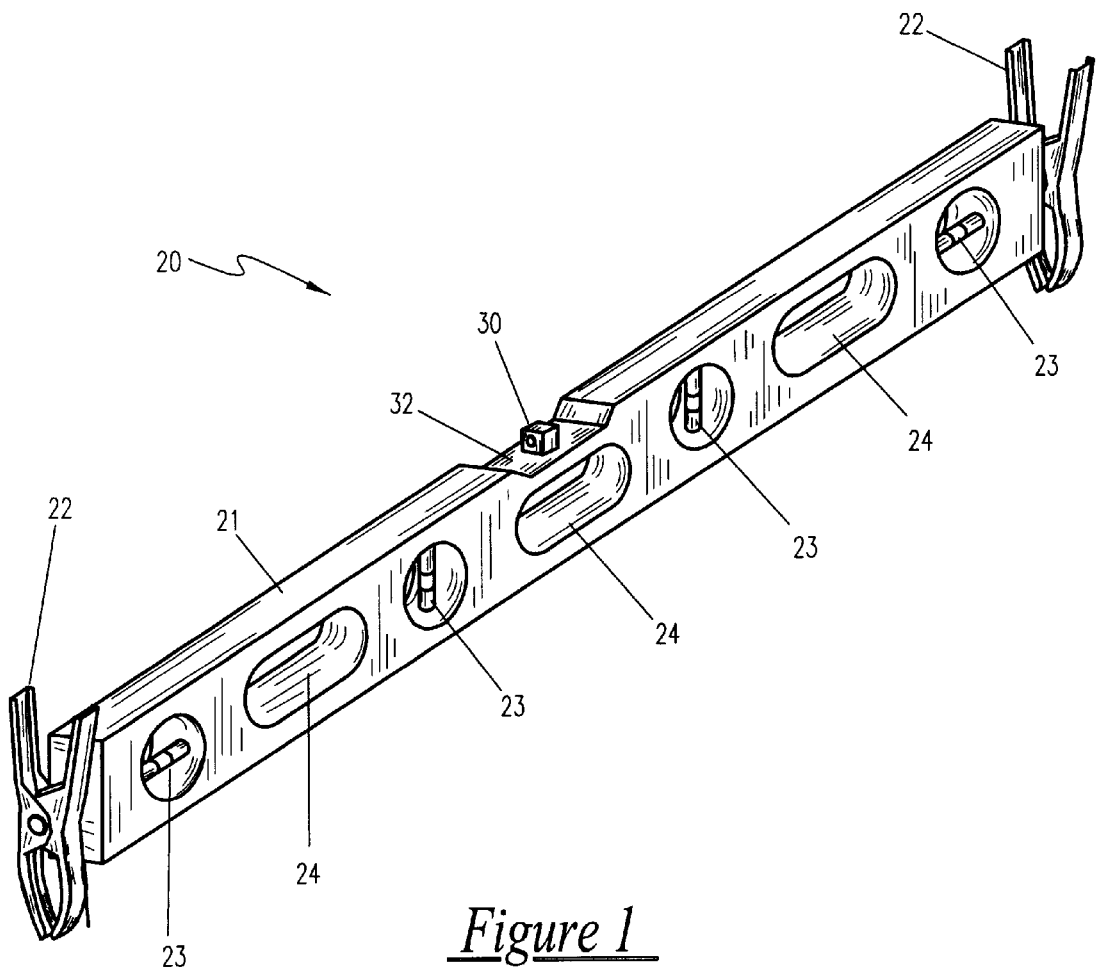
FIG. 1 is a perspective view of the self-supporting level measurement device, according to the preferred embodiment.
Figure 2:
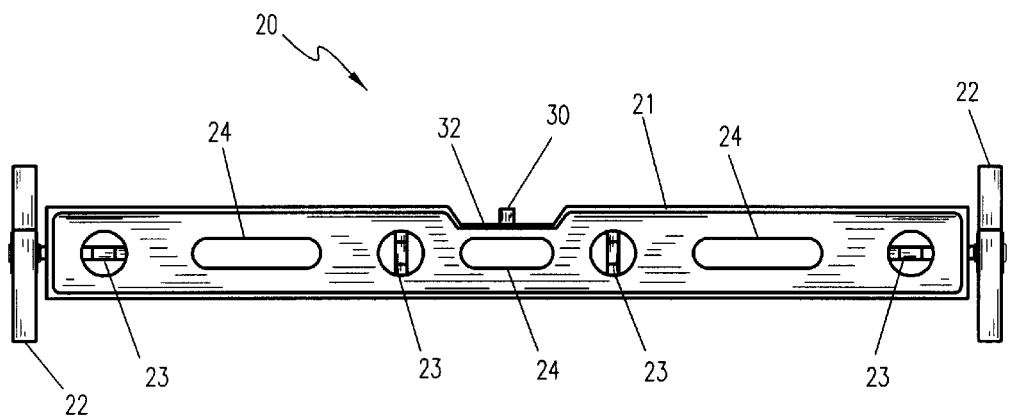
FIG. 2 is a front view of the self-supporting level measurement device.
Figure 3:
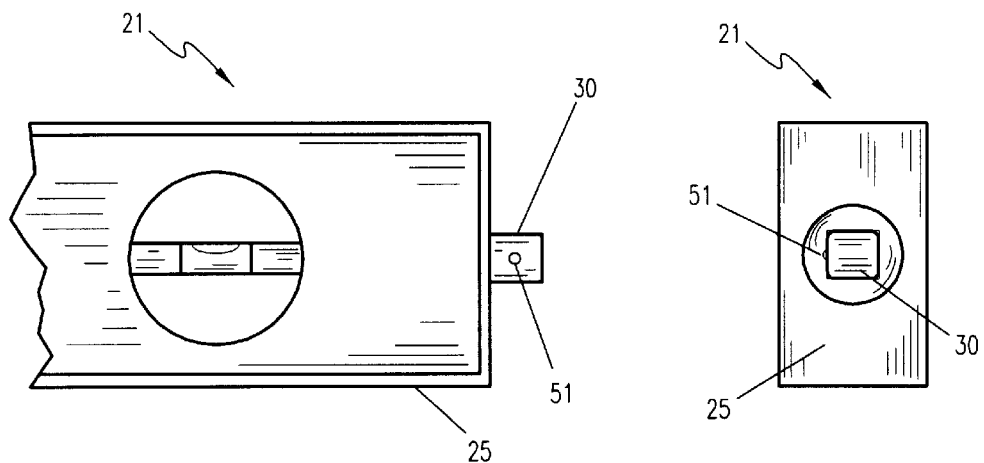
FIG. 3 is a partial front view of the self-supporting level measurement device, depicting the pin attaching means thereof.
Figure 4:
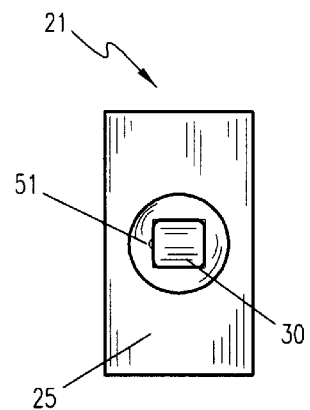
FIG. 4 is an end view of the self-supporting level measurement device, depicting the pin attaching means thereof.

20 Self-Supporting Level Measurement Device
21 Level Measurement Device
22 Spring-Biased Clamping Device
23 Bubble Level Indicators
24 Carrying Handles
25 Frame
30 Clamp Securing Pins
32 Pin Recess
35 Outer Clamp Arm
36 Inner Clamp Arm
37 Clamp Securing Sleeve
38 Outer Clamp Handle End
39 Outer Clamp Securing End
40 Inner Clamp Handle End
41 Inner Clamp Securing End
45 Clamp Biasing Spring
46 Securing Pads
50 Pin Socket
51 Pin Retainer Ball
55 Framing Member

DESCRIPTION OF THE PREFERRED EMBODIMENTS

1. Detailed Description of the Figures

Referring now to FIGS. 1–4, depicted is the self-supporting level measurement device, hereinafter self-supporting level 20, according to the preferred embodiment. The self-supporting level 20 consists of a level measurement device 21 adapted so as to incorporate the use of a plurality of spring-biased clamping devices, hereinafter clamps 22. The self-supporting level 20 consists of an elongated frame 25, constructed of wood, metal, plastic, or a combination thereof, that houses a plurality of bubble level indicators 23 and a plurality of carrying handles 24. The bubble level indicators 23 are oriented perpendicular and parallel to the longitudinal axis of the frame 25. Clamp securing pins 30, generally cubic in shape and located protruding from each end of the level measurement device 21 as well as from the midpoint thereof. The clamp securing pin 30 that is located at the midpoint rests in a pin recess 32, the purpose of which will be described in further detail hereinbelow.

Referring now to FIGS. 5–8, depicted in detail is a clamp 22 in accordance with the present invention. The clamp 22 consists of an outer clamp arm 35 and an inner clamp arm 36, adjoined in an opposing fashion and pivotally attached to one another via a clamp securing sleeve 37. The outer clamp arm 35 consists of an outer clamp handle end 38 opposite an outer clamp securing end 39 and the inner clamp arm 36 consists of an inner clamp handle end 40 opposite an inner clamp securing end 41. The outer clamp arm 35 and inner clamp arm 36 are spring biased against one another by a clamp biasing spring 45 such that the outer clamp securing end 39 and inner clamp securing end 41 are drawn together. Thus, when an object (not shown) is placed between the outer clamp securing end 39 and the inner clamp securing end 41 a frictional force is created therebetween, attaching the clamp 22 to the object. Securing pads 46 are located at the end portion of the outer clamp securing end 39 and the inner clamp securing end 41 and create an enhanced frictional engagement between the clamp 22 and the material to which it is attached.

Referring now to FIGS. 1–8, the clamp securing sleeve 37 is equipped with a pin socket 50, consisting of a rectangular aperture extending the length thereof. The dimensions of the pin socket 50 are such that the clamp securing pins 30 can be inserted and removed with a minimal clearance allowing unrestricted travel therein. The clamp securing pins 30 include a pin retainer ball 51, consisting of a ball bearing seated in a recess in the sidewall of the clamp securing pin 30 and spring biased therein such that the ball bearing can be compressed flush with the pin sidewall. The pin socket 50 includes a pin retainer groove (not shown) consisting of a recessed groove machined along the perimeter of the inner wall of the pin socket 50. Thus, the clamps 22 can be secured to the level measurement device 21 by sliding the pin socket 50 over the clamp securing pin 30. The pin retainer ball 51 is compressed within its seat until it reaches the pin retainer groove. Upon doing so, the spring biasing of the pin retainer ball 51 will force it into the pin retainer groove, thus securing the clamp 22 to the level measurement device 21. The clamp 22 can be removed by applying the force necessary to overcome that of the spring biasing of the pin retainer ball 51.

Figure 10:
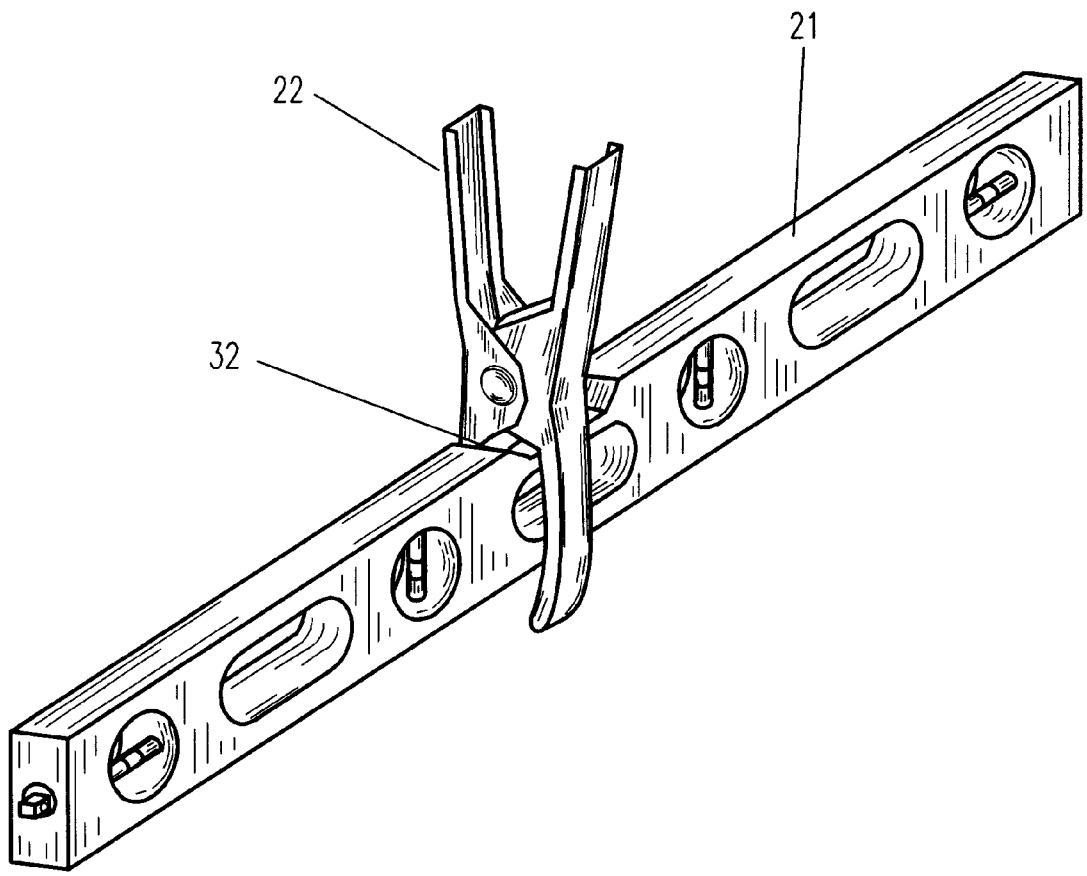
FIG. 10 is a perspective view of the self-supporting level measurement device, according to an alternate embodiment.

Referring now to FIG. 10, in an alternate embodiment, the clamp 22 is fitted with a midpoint attaching means (not shown), similar in nature to that of the pin socket 50, that allows for attachment of the clamp 22 to the level measurement device 21 on the clamp securing pin 30 located in the pin recess 32. The midpoint attaching means is located between the outer clamp arm 35 and the inner clamp arm 36 the such that, when the clamp 22 is secured to the clamp securing pin 30 in the pin recess 32, the level measurement device 21 rests between the outer clamp handle 38 and the inner clamp handle 40. In this configuration, the recessed location of the clamp securing pin 30 allows the level measurement device 21 to rest flush upon the surface to which it is attached.

2. Operation of the Preferred Embodiment

Figure 9:
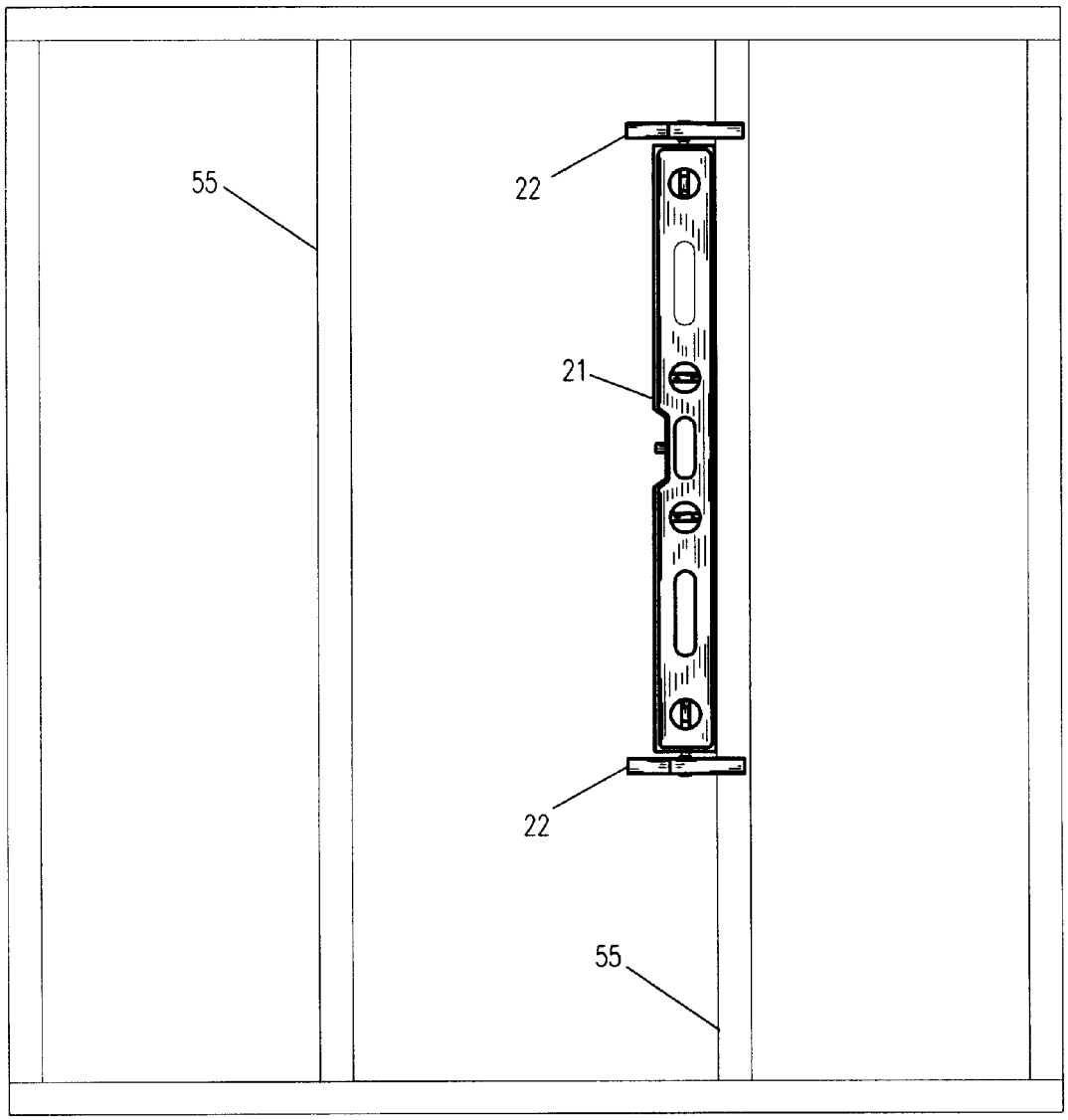
FIG. 9 is a front view of the self-supporting level measurement device in its use according to the preferred embodiment.

Referring now to FIG. 9, the self-supporting level measurement device 20 is shown in use according to the preferred embodiment. In this configuration, clamps 22 are affixed to both ends of the level measurement device via the clamp securing pins 30 and the pin sockets 50. The self-supporting level measurement device 20 is secured to a framing member 55, typical of those found in construction projects and the like, and is being used to indicate the vertical orientation thereof. The positioning of the level measurement device 21 flush against the framing member 55 ensures accurate level indication.

Figure 11:
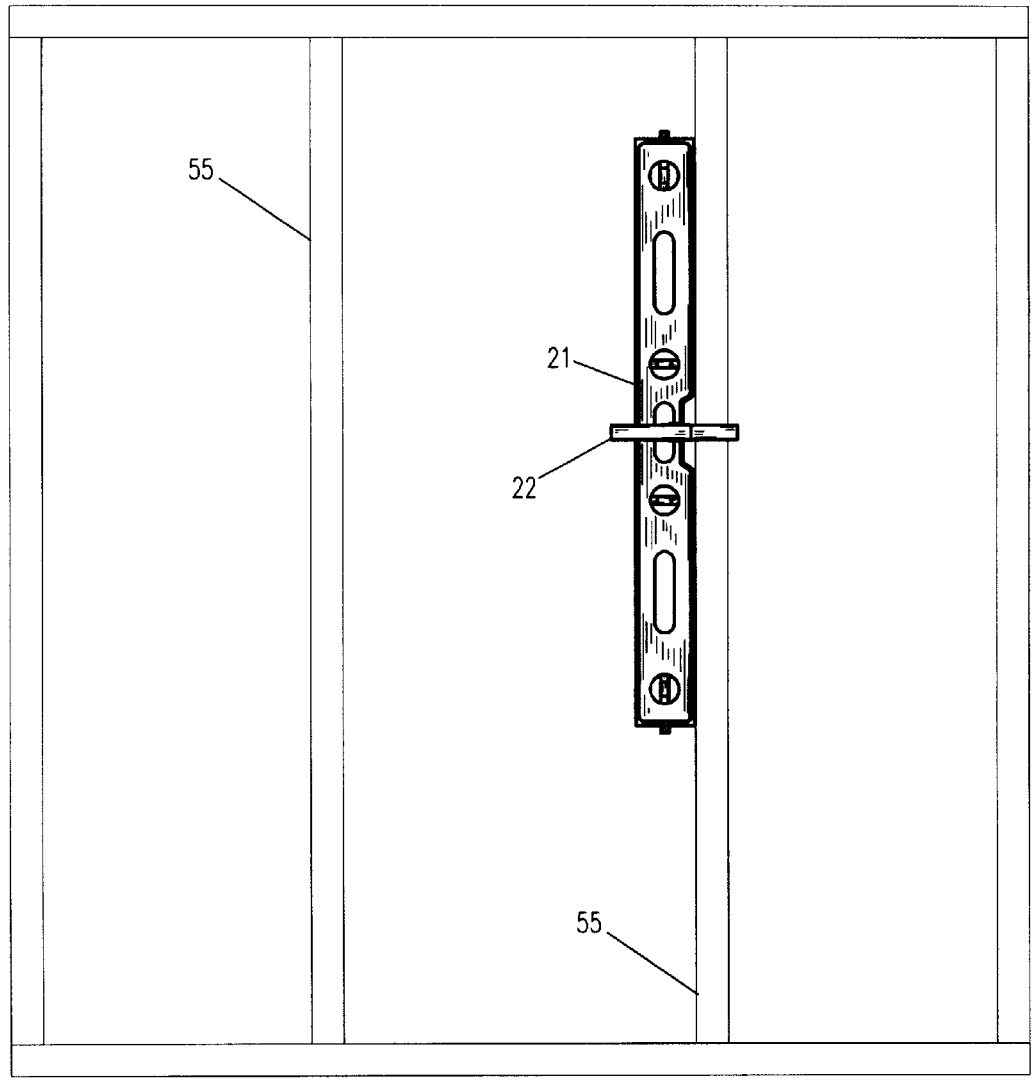
FIG. 11 is a front view of the self-supporting level measurement device in its use according to an alternate embodiment.

Referring now to FIG. 11, the self-supporting level measurement device 20 is shown in use according to the alternate embodiment. In this configuration, a clamp 22 is affixed to the midpoint of the level measurement device via the clamp securing pin 30, located in the pin recess 31, and the pin sockets 50. The self-supporting level measurement device 20 is secured to a framing member 55, typical of those found in construction projects and the like, and is being used to indicate the vertical orientation thereof. The pin recess 31 causes the position of the clamp 22 to be such that the level measurement device 21 rests flush against the framing member 55, thus ensuring accurate level indication.

While the preferred embodiments of the invention have been shown, illustrated and described, it will be apparent to those skilled in this field that various modifications may be made in these embodiments without departing from the spirit of the present invention. It is for this reason that the scope of the invention is set forth in and is to be limited only by the following claims.

What is claimed is:

1. A self-supporting level measurement device for indicating true vertical or horizontal orientation of surfaces, said self-supporting level measuring device comprising:

a bubble level measurement device having a linearly elongated rectangular frame, with a first end opposite a second end and having a midpoint recess, said midpoint recess being a C-shaped cavity having a recessed surface oriented parallel to the longitudinal axis of said rectangular frame, said bubble level measurement device having clamp securing pins protruding from said first end, said second end, and said midpoint recess; and at least two spring biased clamping devices for removably affixing said frame to a workpiece each device consisting of an outer clamp arm and an inner clamp arm arranged opposing one another and pivotally attached near the midpoints thereof by a clamp securing sleeve, said clamp securing sleeve being generally cylindrical in shape and having a clamp securing pin socket bored therein, providing removable connectivity of said at least two spring biased clamping devices to said clamp securing pins, thus attaching said at least two spring biased clamping devices to said bubble level measurement device.

2. The self-supporting level measuring device of claim 1, wherein said clamp securing pins further comprise a plurality of extended protrusions having a clamp securing pin sidewall recess, said clamp securing pin sidewall recess having a clamp securing pin retainer ball bearing seated and retained therein, said clamp securing pin retainer ball bearing protruding from and spring biased in said clamp securing pin sidewall recess such that said clamp securing pin retainer ball bearing can be compressed flush with the surface thereof.

3. The self-supporting level measuring device of claim 1, wherein said clamp securing pin socket further comprises an aperture extending the length of said clamp securing sleeve, said clamp securing pin socket having dimensions such that said clamp securing pins can be inserted therein with minimal clearance, said clamp securing pin socket having a clamp securing pin retainer groove comprising a recessed groove machined along the perimeter of the inner wall of said clamp securing pin socket.

4. The self-supporting level measuring device of claim 1 wherein said at least two spring biased clamping devices are secured to said bubble level measurement device, said securing pin socket sliding over said clamp securing pins, compressing said clamp securing pin retainer ball bearing into said clamp securing pin sidewall recess and said clamp securing pin retainer ball bearing releasing into said clamp securing pin retainer groove, creating a friction fit therewith and thereby fastening said at least two spring biased clamping devices to said bubble level measurement device.

\* \* \* \* \*